United States Patent [19]

Kimoto

[11] 4,386,374

[45] May 31, 1983

[54] ELECTRONIC DUPLICATOR WITH A LINE BUFFER MEMORY

[75] Inventor: Katsumi Kimoto, Kawasaki, Japan

[73] Assignee: Tokyo Shibaura Denki Kabushiki Kaisha, Kawasaki, Japan

[21] Appl. No.: 105,863

[22] Filed: Dec. 20, 1979

[30] Foreign Application Priority Data

Dec. 27, 1978 [JP] Japan .......................... 53-180546[U]
Mar. 7, 1979 [JP] Japan ................... 54-26307

[51] Int. Cl.³ ...................... H04N 1/24; H04N 5/84; G01D 15/14
[52] U.S. Cl. .................................. 358/302; 358/285; 346/108
[58] Field of Search ............. 346/108, 76 L; 355/3 R, 355/3; 354/5; 358/77, 78, 296, 302, 280, 285

[56] References Cited

U.S. PATENT DOCUMENTS

| | | | |
|---|---|---|---|
| 3,475,760 | 10/1969 | Carlson | 346/76 L |
| 3,541,245 | 11/1970 | Wilby | 358/280 |
| 3,956,583 | 5/1976 | Pugsley | 358/78 X |
| 3,999,010 | 12/1976 | Oosaka et al. | 358/302 |
| 4,012,585 | 3/1977 | Chen | 358/302 |
| 4,122,462 | 10/1978 | Hirayama et al. | 346/108 X |
| 4,127,870 | 11/1978 | Colditz | 358/77 |
| 4,135,212 | 1/1979 | Pugsley et al. | 358/296 X |
| 4,198,701 | 4/1980 | Reddersen et al. | 358/302 X |
| 4,205,350 | 5/1980 | Gunning | 358/296 |

Primary Examiner—Aristotelis M. Psitos
Attorney, Agent, or Firm—Cushman, Darby & Cushman

[57] ABSTRACT

The surface of an original is scanned in the direction of lines with a laser beam to obtain read-out data from the reflected light beam from the original, and the read-out data for a line are first stored in a line buffer memory. Then, during the scanning for the next line by the laser beam the data which have been stored in the line buffer memory are read out and used to modulate a laser beam, with the laser beam thus modulated being led to a light-sensitive drum for making duplication of information of the read-out data.

2 Claims, 16 Drawing Figures

ELECTRONIC DUPLICATOR WITH A LINE BUFFER MEMORY

BACKGROUND OF THE INVENTION

This invention relates to an electronic duplicator, in which data obtained by scanning the surface of an original for one line with a light beam are stored once in a line buffer memory and then read out therefrom for making duplication on a light-sensitive drum.

In commonly termed scanning type electronic duplicating apparatus, a light beam from a light source such as a laser is used to scan the surface of an original, and the reflected light from the original is introduced into a photoelectric cell for conversion into a corresponding electric signal which is in turn used to control a light beam modulator for on-off modulating a light beam, with the light beam thus modulated being projected onto a light-sensitive drum for duplication. These electronic duplicators include one, in which a single optical system is commonly used both for reading out data from an original and for reproducing the original on a light-sensitive drum from an electric signal containing the read-out data. With this construction, however, the read-out from the original and duplication on the light-sensitive drum cannot simultaneously be taken place.

Accordingly, it has been in practice to let data which are read out from the surface of an original by scanning the entirety thereof with an optical system be stored in a buffer memory and, after the completion of the read-out of the entire original, let the data having been stored in the buffer memory be used to control a light beam modulator for making duplication on a light-sensitive drum with the same optical system. However, this conventional system requires a buffer memory of an enormous capacity for memorizing all the data read out from the entire original, thus, making the electronic duplicator very expensive.

SUMMARY OF THE INVENTION

An object of the invention is to provide a scanning type electronic duplicator, in which a single optical system can be used for both read-out and duplication, and also which requires a very small buffer memory capacity and is inexpensive and simple in construction.

According to the invention, the above object is achieved by constructing the scanning type electronic duplicator such that data obtained through light beam scanning of an original for one line by using an optical system are stored once in a line buffer memory which has a capacity corresponding to the read-out data for one line and that the data thus stored in the line buffer memory are then read out therefrom and used for duplication on a light-sensitive drum by using the same optical system.

BRIEF DESCRIPTION OF THE DRAWINGS

This invention can be more fully understood when taken in conjunction with the accompanying drawings in which.

DESCRIPTION OF THE PREFERRED EMBODIMENTS

Figure 1:
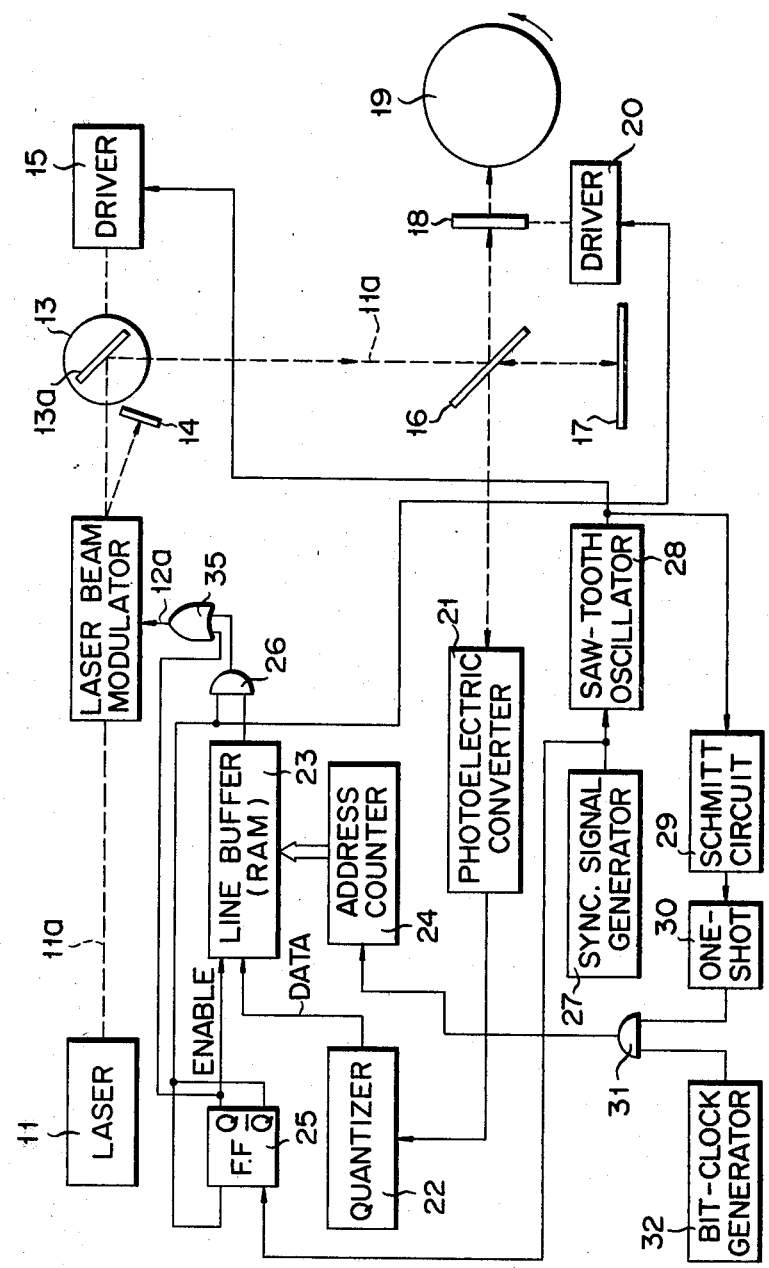
FIG. 1 is a block diagram showing the circuit construction of one embodiment of the electronic duplicator according to the invention.

The invention will now be described in conjunction with some preferred embodiments thereof with reference to the accompanying drawings, in which like parts are designated by like reference numerals.

Referring now to FIG. 1, which shows one embodiment of the invention, a light beam, for instance a laser beam 11a projected from a laser 11, is led through a laser beam modulator 12 to a laser beam deflector or scanner 13. The laser beam modulator 12 is switched to lead the input laser beam 11a either to the laser beam deflector 13 or to a collector 14 in accordance with whether a digital signal supplied to its control input terminal 12a is "1" or "0". Laser beam modulator 12 may advantageously be a supersonic modulator. The laser beam deflector or scanner 13 has a plane mirror 13a, which is driven by a driver 15 such that inclination of its reflecting surface is caused to vary over a predetermined angular range with respect to the laser beam 11a.

The laser beam 11a having been reflected by the plane mirror 13a is led to a half mirror 16 to be split thereby into two beams, one transmitted therethrough and led to an original 17 and the other reflected by the half mirror 16 and led through a shutter 18 to be incident on a light-sensitive drum 19. The laser beam 11a incident on the surface of the original 17 is reflected thereby, and the intensity of the reflected laser beam varies according to the scanned information on the original 17. This reflected laser beam 11a is reflected by the back surface of the half mirror 16 to be led to a photoelectric converter 21 for conversion to a corresponding electric signal.

The electric signal thus obtained is supplied to a quantizer 22 for conversion into a binary signal with logic levers "1" and "0", which is in turn supplied to a data input terminal of a line buffer memory 23. The line buffer memory 23 may consist of a random access memory (RAM) which receives an address designation signal from an address counter 24. The storage capacity of the RAM 23 is set to correspond to the data that are obtained through the scanning of the original 17 for one line by the laser beam 11a. The line buffer memory 23 has a write enable terminal, to which an enable signal is supplied from the Q output terminal of a flip-flop 25. The flip-flop 25 has its $\overline{Q}$ output terminal connected to one input terminal of an AND gate 26, which has its other input terminal connected to a data output terminal of the RAM 23 and its output terminal connected to one input terminal of an OR gate 35. The other input terminal of the OR gate 35 is connected to the Q output terminal of the flip-flop 25. The output terminal of the OR gate 35 is connected to the control input terminal 12a of the laser beam modulator 12.

Synchronizing pulses are supplied from a synchronizing signal generator 27 to an input terminal of the flip-flop 25. These synchronizing pulses are generated each in synchronism to each sweep of the original 17 by the laser beam 11a. This synchronizing signal is also supplied to a saw-tooth oscillator 28. A saw-tooth wave produced from the saw-tooth oscillator 28 is supplied to the driver 15 for driving the laser beam scanner 13, and is also supplied to a schmitt circuit 29. The schmitt circuit 29 produces a pulse upon detection of a predetermined level L1 (see FIG. 2(b)) of the saw-tooth wave output of the saw-tooth oscillator 28, and the pulse output from the schmitt circuit 29 drives a one-shot circuit 30. The one-shot circuit 30 produces a pulse output of a predetermined pulse width, which is supplied as a gating signal to one input terminal of an AND gate 31. To the other input terminal of the AND gate 31 are supplied bit-clock pulses, which are produced from a bit-clock generator 32 in synchronism to the sampling operation of the quantizer 22. The bit-clock pulses that have been gated through the AND gate 31 are supplied as address information to the address counter 24.

Figure 2:
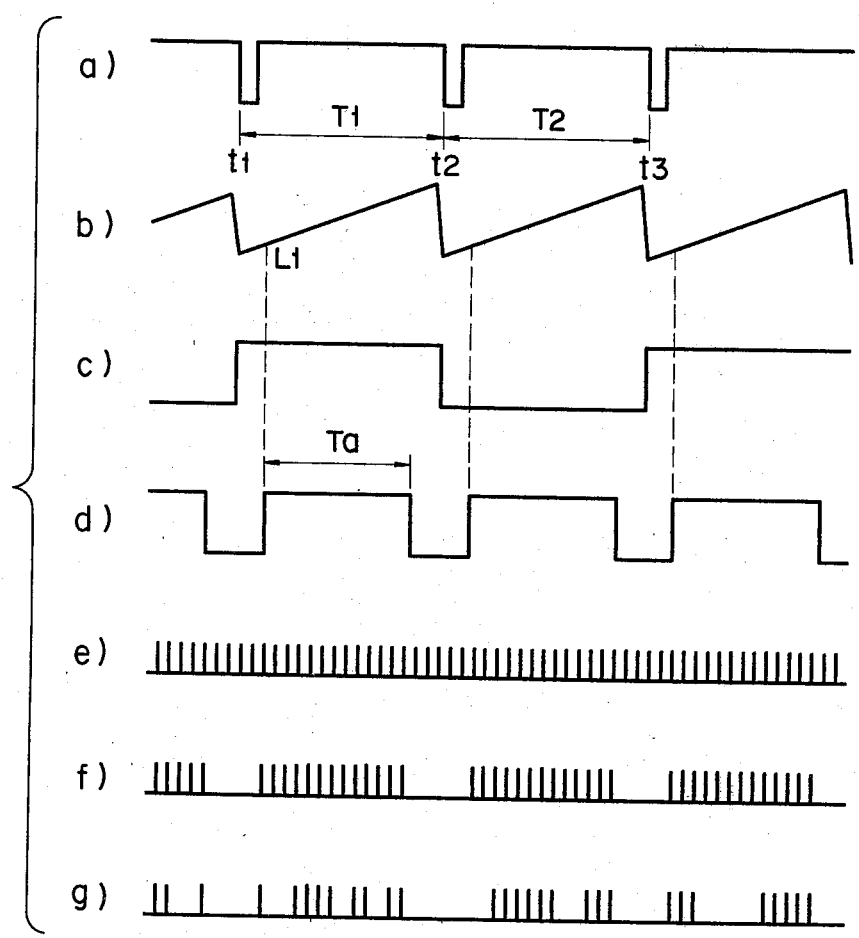
FIG. 2, consisting of a-g, is a time chart for illustrating the operation of the embodiment shown in FIG. 1.

The operation of the embodiment shown in FIG. 1 will now be described with reference to FIG. 2. It is assumed that in the initial state the laser 11 is being driven, but the driver 15 is not, with the spot of the laser beam 11a held stationary at a position of start of scanning of the original 17. Also, it is assumed that the driver 20 is not driven, with the shutter 18 held closed. The synchronizing signal generator 27 produces synchronizing pulses each for each period T as shown in FIG. 2(a), these pulses being negative pulses with a small pulse width. The saw-tooth oscillator 28 produces a saw-tooth wave of a waveform as shown in FIG. 2(b) in response to the falling of the synchronizing pulses. The driver 15 receives this saw-tooth wave and drives the scanner 13 by using each rising portion of the saw-tooth wave such that the scanner 13 scans the original 17 from one end thereof to the other at a constant speed with the laser beam 11a. The scanner 13 causes high speed retrace of the laser beam 11a from the afore-mentioned other end of the original 17 back to the first end for each short falling portion of the saw-tooth wave.

The flip-flop 25 is set in response to the falling of a synchronizing pulse from the generator 27 and is reset in response to the falling of the next synchronizing pulse. In consequence, an output with a period of 2T ($=T1+T2$), as shown in FIG. 2(c) is obtained from the Q output terminal of the flip-flop 25. During the period between instants $t_1$ and $t_2$ the RAM 23 is held in a write enable state by the Q output of the flip-flop 25, and during this period the binary data obtained from the quantizer 22 with the scanning of the original 17 for a line is stored in the RAM 23. The laser beam modulator 12 is also driven by the Q output to render the beam 11a to pass to the scanner 13. The lateral dimension of the original 17 which is scanned by the laser beam 11a in the period of T is set to be slightly greater than the portion where actual information is recorded. The data to be stored in the RAM 23 should be only that in the aforementioned portion where actual information is recorded. Accordingly, in the present embodiment the bit-clock output supplied from the bit-clock generator 32 to the address counter 24 is gated for a period $T_a$ corresponding to the portion where actual information is recorded. More particularly, the one-shot circuit 30 is driven when a level L1 of the saw-tooth wave rising portion corresponding to the instant of start of the period $T_a$ is detected by the schmitt circuit 29 as shown in FIG. 2(d). For the instant of end of the period $T_a$ the pulse width of the output of the one-shot circuit 30 may be set to coincide with the period $T_a$. In this way, successive bit clock pulses from the generator 32 as shown in FIG. 2(e) are gated through the AND gate 31 under the control of the output of the one-shot circuit 30, so that bit clock pulses are supplied to the address counter 24 only for the period $T_a$. The address counter 24 counts these gated bit clock pulses, and the RAM 23 stores successive data from the quantizer 22 in addresses designated in accordance with the count contents of the address counter 24. Thus, the binary data of levels "1" and "0" supplied from the quantizer 22 and stored in the RAM 23 are only those in the portions of the original where actual information is recorded and corresponding to the period $T_a$ shown in FIG. 2(g). The capacity of the address counter 24 is set equal to the number of bit clock pulses permitted through the AND gate 31 during the period $T_a$, and after the period $T_a$ the address counter 24 returns itself to the initial state by producing a carry signal.

When the instant $t_2$, corresponding to the falling of the second synchronizing pulse, is reached, the saw-tooth wave is supplied again to the driver 15, so that the scanner 13 is driven again in the manner as described above. Consequently, the original 17 is scanned by the laser beam 11a in the same manner as in the previous sweep, and data are supplied through the photoelectric converter 21 and quantizer 22 to the RAM 23. However, since the flip-flop 25 has already been reset with the second synchronizing pulse at the instant $t_2$, no write enable signal is supplied to the RAM 23, and hence data produced in the second period T2 are not stored therein. Meanwhile, the AND gate 26 is held open at this time by the $\overline{Q}$ output of the flip-flop 25, so that data obtained during the period T1 are read out from the RAM 23 in the order of writing them in the previous period T1 in accordance with the address designation by the address counter 24 for impression upon the control terminal of the laser beam modulator 12. The laser beam modulator 12 functions such that it directly passes the laser beam 11a to the scanner 13 when the input signal is "1" while deflecting the laser beam 11a toward the collector 14 when the input signal is "0". When the data input signal is "1", the laser beam 11a is thus reflected by the mirror 13a and then partly reflected by the half mirror 16 to reach the shutter 18. The shutter 18 is at this time being driven by the driver 20 under the control of the $\overline{Q}$ output of the flip-flop 25 and thus held open, and the laser beam 11a is permitted through the shutter 18 to reach the light-sensitive drum 19 for recording "1" thereon. When the data input signal is "0", the laser beam 11a is deflected to the collector 14, and "0" is recorded on the light-sensitive drum 19.

In the above manner, the writing of data to the RAM 23 and recording of data read out from the RAM 23 on the light-sensitive drum 19 are alternately effected every time a synchronizing pulse is generated. Since the duplicating system according to the invention is based upon the duplication of data which are obtained as the original 17 is scanned in the lateral direction (i.e., direction of lines) for every other line by the laser beam 11a, taking a large shift of the scanning position in the direction of column (i.e., interval between adjacent lines) in the scanner 13 is likely to deteriorate the quality of duplication. In case of an original size of, for instance, A4, by setting the number of lines to 2,300 and the synchronizing pulse frequency to 732 Hz the duplicating period for one original was 3.5 seconds, and in this case a copy of very high resolution could be obtained in a comparatively short period of time. Also in this case, the number of the bit clock pulses for the period T1 in FIG. 2(b) was 2,048, and that for the period $T_a$ was 1,728. In this case, the address counter 24 may be a scale of 1,728 counter, and the RAM 23 needs to have only a shortage capacity of 2,048 bits at the most.

Figure 3:
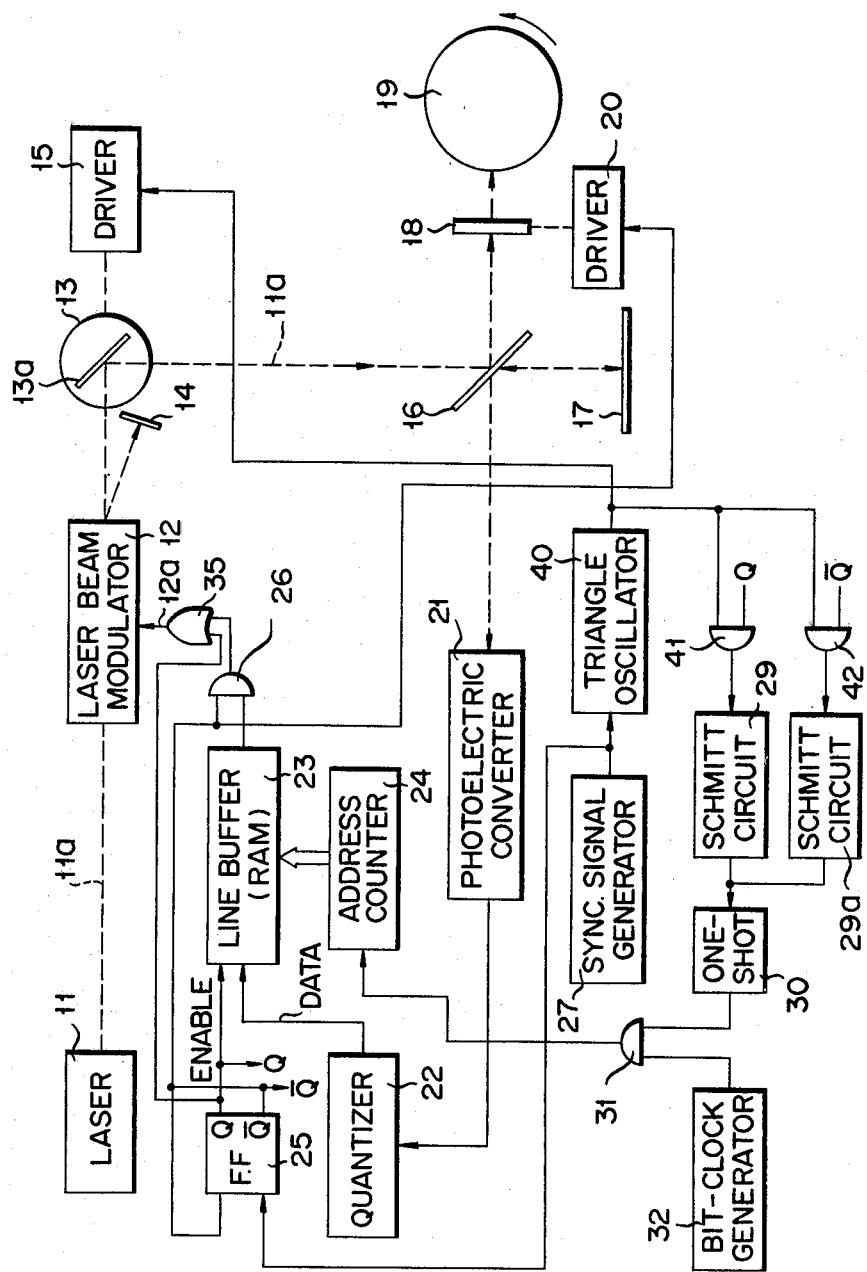
FIG. 3 is a block diagram showing the circuit construction of another embodiment of the electronic duplicator according to the invention.

FIG. 3 shows another embodiment, in which a triangle oscillator 40 is used in lieu of the saw-tooth generator 28 in the embodiment of FIG. 1. The output of the triangle oscillator 40 is supplied to driver 15, and is also coupled to one input terminal of each of two AND gates 41 and 42. To the other input terminal of the AND gate 41 is coupled the Q output of the flip-flop 25, and to the other input terminal of the AND gate 42 is coupled the $\overline{Q}$ output thereof. The outputs of the AND gates 41 and 42 are supplied to respective input terminals of schmitt circuits 29 and 29a. The outputs of the schmitt circuits 29 and 29a are commonly supplied to the input terminal of one-shot circuit 30. The triangular wave produced from the triangle oscillator 40 has a waveform as shown in FIG. 4(b), having a rising period T1 and a falling period T2. In the previous first embodiment the scanner 13 has been driven by the saw-tooth wave (FIG. 2(b)) such that the laser beam 11a scans the original 17 for one line in the period T1 and then quickly retraces, whereas in the embodiment of FIG. 3 the laser beam 11a is caused to scan the original 17, for instance, from left to right for a line in the period T1 and then scan in the converse direction, that is, from right to left for the next line in the next period T2.

Figure 4:
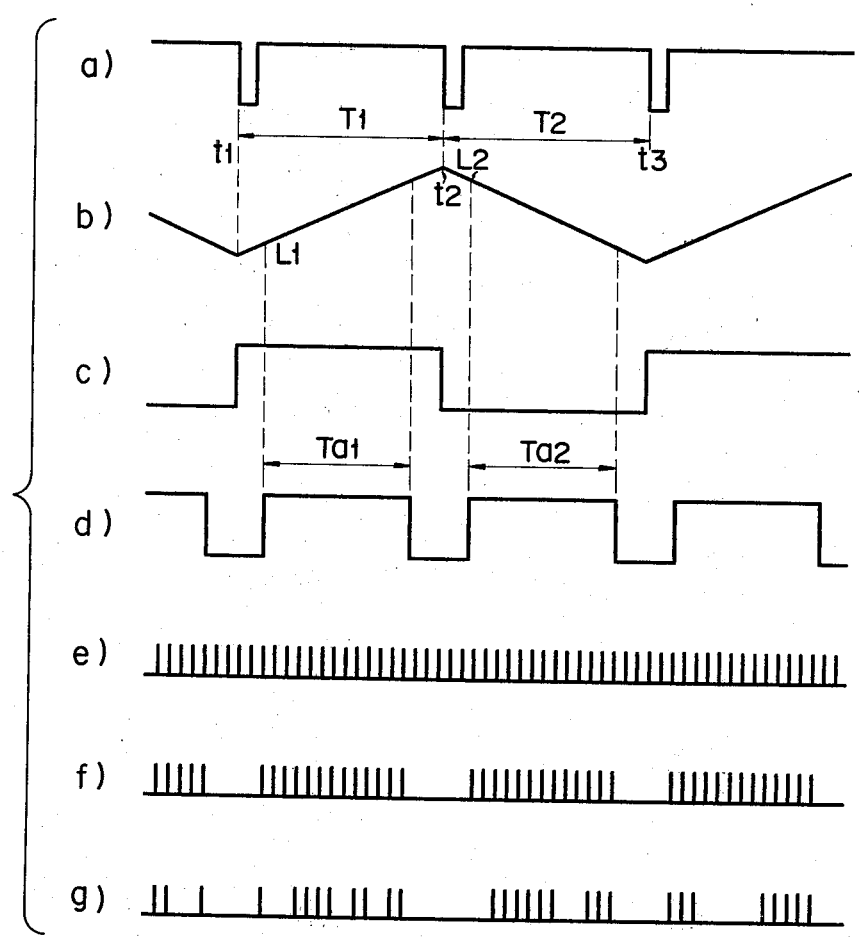
FIG. 4, consisting of a-g, is a time chart for illustrating the operation of the embodiment shown in FIG. 3.

The operation of the embodiment of FIG. 3 will now be described with reference to FIG. 4. When a first synchronizing pulse is produced from synchronizing signal generator 27 at an instant $t_1$ as shown in FIG. 4(a), the triangular wave as shown in FIG. 4(b) is produced from the triangle oscillator 40 and supplied to the driver 15. The driver 15 receives this triangular wave and drives the scanner 13 such that the laser beam 11a scans the original 17 at a constant speed from left to right. The flip-flop 25 is set by the first synchronizing pulse, and it supplies a write enable signal as shown in FIG. 4(c) to RAM 23. Also, the schmitt circuit 29 receives the triangular wave which is gated through the AND gate 41 under the control of the output of the flip-flop circuit 25, and the circuit 29 delivers a trigger signal to the one-shot circuit 30 upon detection of a predetermined level L1 of the triangular wave in the rising period T1 thereof as shown in FIG. 4(b). As a result, the one-shot circuit 30 produces a gating signal with a pulse width $T_{a1}$ as shown in FIG. 4(d). Meanwhile, the AND gate 42 is not opened since the $\overline{Q}$ output is "0", and the schmitt circuit 29a is thus held inoperative. Subsequently, data are stored in the RAM 23 in the period $T_{a1}$ in the manner as described in connection with the first embodiment.

When the next synchronizing pulse is produced at an instant $t_2$ as shown in FIG. 4(a), the triangular wave turns to fall for a period T2 as shown in FIG. 4(b), and as a result the flip-flop 25 is reset with the Q output inverted to "0" and $\overline{Q}$ output to "1" as shown in FIG. 4(c). Now there prevails a state with the AND gate 41 closed and the AND gate 42 open, so that the triangular wave is only supplied to the schmitt circuit 29a. The schmitt circuit 29a delivers a trigger signal to the one-shot circuit 30 upon detection of a predetermined level L2 of the triangular wave in the period T2. As a result, the one-shot circuit 30 opens the AND gate 31 and holds it open for the predetermined period $T_{a2}$ in the period T2 again this time as shown in FIG. 4(d), and during this period bit clock pulses are supplied to the address counter 24. Thus, data are read out from the RAM 23 and supplied to the laser beam modulator 12 in the order of writing them in the previous period T1, whereby duplication according to the stored data is formed on the light-sensitive drum 19 in the manner as described in connection with the embodiment of FIG. 1. The remaining circuit construction and operation thereof are similar to those of the first embodiment.

In the above embodiments the scanner has been driven with a saw-tooth wave or triangular wave, other waveforms, for instance sinusoidal waves, may be used for driving the scanner as well. And, a conventional dynamic memory consisting of a shift register may also be used for the line buffers shown in FIG. 1 and FIG. 3.

What is claimed is:

1. An electronic duplicator for copying information from an original document comprising:
   a light sensitive drum;
   light source means for generating a single source light beam;
   modulator means for selectively modulating said single source light beam to form a modulated source beam;
   light beam scanner means for controllably deflecting said source beam having passed through said modulator;
   half mirror means, positioned so as to receive light deflected by said scanner, for splitting said single source beam into a first beam for irradiating said original document and a second beam for irradiating said light sensitive drum;
   shutter means, positioned in the path of said second beam between said half mirror means and said photosensitive drum, for controllably blocking or passing said second beam;
   photoelectric converter means, positioned so as to receive said first light beam having been reflected from said original document and carrying information from said original document, for generating electrical signal readout data;
   line buffer memory means, coupled to said photoelectric converter means, for storing one line of said readout data;
   timing control means for controlling the sequence of operation of said shutter means, scanner means and modulator means, said timing control means including a synchronizing signal generator means for producing a synchronizing signal in accordance with a period for scanning one line of the original document by said scanner means, a circuit for producing a saw-tooth wave in accordance with a synchronizing signal output of said synchronizing signal generator means, and a means for driving said scanner means in accordance with said saw-tooth wave, for (a) during a rising period of a first saw-tooth wave, holding said shutter means closed while simultaneously causing said scanner means to deflect the source beam so that said first beam scans a first line of information on said original document, said first line of information being converted into electric signal readout data by said photoelectric converter means and stored in said line buffer memory means, said scanner means returning to its original position during a falling period of said first saw-tooth wave, and (b) during a rising period of a second saw-tooth wave following said first saw-tooth wave, causing readout data stored in said line buffer memory means to be read therefrom and coupled to a modulating input of said modulator means while simultaneously holding said shutter means open so that said second beam irradiates said light sensitive drum thereby imparting the information of said first line thereof, the scanner means returning to its original position during a falling period of said second saw-tooth wave; and memory control means for applying said electric signal readout data from said photoelectric converter means into said line buffer memory means during said rising period of said first saw-tooth wave and for preventing said electric signal readout data from being applied to said line buffer memory during said rising period of said second saw-tooth wave.

2. An electronic duplicator for copying information from an original document comprising:

a light sensitive drum;

light source means for generating a single source light beam;

modulator means for selectively modulating said single source light beam to form a modulated source beam;

light beam scanner means for controllably deflecting said source beam having passed through said modulator means;

half mirror means, positioned so as to receive light deflected by said scanner means, for splitting said single source beam into a first beam for irradiating said original document and a second beam for irradiating said light sensitive drum;

shutter means, positioned in the path of said second beam between said half mirror and said photosensitive drum, for controllably blocking or passing said second beam;

photoelectric converter means, positioned so as to receive light reflected from said original document carrying information from said original document, for generating electric signal readout data;

line buffer memory means, coupled to said photoelectric converter means, for storing one line of said readout data;

timing control means for controlling the sequence of operation of said shutter means, scanner means and modulator means, said timing control means including means for generating a synchronizing signal in accordance with a scanning period for one line of the original document by said scanning means, a circuit for producing a triangular wave rising for a line scanning period and falling for the next line scanning period in accordance with the synchronizing signal from said generator, and a means for (a) during a rising period of a triangular wave, holding said shutter means closed while simultaneously causing said scanner means to deflect the source beam so that said first beam scans a first line of information on said original document, a first line of information in the light reflected from said document being converted into electric signal readout data by said photoelectric converter means and stored in said line buffer memory, and (b) during a falling period of said triangular wave, causing the scanning of the original document in the converse direction by said scanning means while also causing readout data stored in said line buffer memory to be read out therefrom and coupled to a modulating input of said modulator means while simultaneously holding said shutter means open so that said second beam irradiates said light sensitive drum thereby imparting the information of said first line thereto; and memory control means for applying said electric signal readout data from said photoelectric converter into said line buffer memory during said rising period and for preventing said electric signal readout data from being applied to said line buffer memory during said falling period.

* * * * *